United States Patent [19]
Piasecki

[11] Patent Number: 5,123,613
[45] Date of Patent: * Jun. 23, 1992

[54] ROTARY WING AIRCRAFT SHROUDED PROPELLER TAIL ASSEMBLY AND CONTROLS

[75] Inventor: Frank N. Piasecki, Haverford, Pa.

[73] Assignee: Piasecki Aircraft Corporation, Essington, Pa.

[*] Notice: The portion of the term of this patent subsequent to Mar. 6, 2007 has been disclaimed.

[21] Appl. No.: 403,679

[22] Filed: Sep. 6, 1989

Related U.S. Application Data

[63] Continuation-in-part of Ser. No. 209,576, Jun. 21, 1988, Pat. No. 4,905,932.

[51] Int. Cl.⁵ .................. B64C 27/82; B64C 27/78
[52] U.S. Cl. .................. 244/17.19; 244/17.13; 244/52
[58] Field of Search ............ 244/17.13, 17.19, 17.21, 244/12.5, 23 D, 52, 53 B

[56] References Cited

U.S. PATENT DOCUMENTS

| | | | |
|---|---|---|---|
| 2,518,697 | 8/1950 | Lee | 244/17.19 |
| 3,015,460 | 1/1962 | Christenson | 244/17.19 X |
| 3,138,349 | 6/1964 | Piasecki | 244/17.21 |
| 3,222,012 | 12/1965 | Piasecki | 244/17.21 |
| 3,241,791 | 3/1966 | Piasecki | 244/17.19 |
| 3,260,482 | 7/1966 | Stroukoff | 244/17.19 X |
| 3,309,937 | 3/1967 | Meyers et al. | 244/232 X |
| 3,332,643 | 7/1967 | Toner | 244/17.21 X |
| 4,493,465 | 1/1985 | Howlett et al. | 244/17.13 |
| 4,591,112 | 5/1986 | Piasecki et al. | 244/17.13 X |
| 4,807,129 | 2/1989 | Perks | 244/17.13 X |
| 4,905,932 | 3/1990 | Piasecki | 244/17.19 |

Primary Examiner—Margaret A. Focarino
Assistant Examiner—James M. Kannofsky
Attorney, Agent, or Firm—Willard M. Hanger

[57] ABSTRACT

An improved control system for a rotary wing aircraft having a tail assembly comprising an annular duct within the interior of which a variable pitch propeller is concentrically mounted for rotation forwardly of movable surfaces for deflecting the slip stream generated by the propeller transversely of the duct as will provide transversely directed thrust forces for amounts required to counteract rotor torque and provide directional control of the aircraft in azimuth. The improvement comprises a collective pitch torque compensation unit connected between the pilot's rotor collective pitch control and the pitch control actuator of the propeller in which the compensation unit establishes changes in the pitch of the tail propeller that are proportional to changes in the rotor collective pitch in amounts that vary dependent upon the high or low range pitch setting of a pilot operable propeller pitch adjusting switch, whereby compensating thrust forces are automatically generated in counteracting changes in rotor torque created by changes in rotor collective pitch.

4 Claims, 6 Drawing Sheets

ROTARY WING AIRCRAFT SHROUDED PROPELLER TAIL ASSEMBLY AND CONTROLS

This is a continuation-in-part of application Ser. No. 209,576 filed Jun. 21, 1988, now U.S. Pat. No. 4,905,932.

BACKGROUND OF THE INVENTION

My invention relates to an improved shrouded propeller tail duct or a "ring tail" assembly for a rotary wing aircraft, particularly a single rotor compound helicopter in which a fixed wing provides lift for high speed forward flight with the rotor unloaded, and the controls by means of which the tail assembly components are operated to control the aircraft during the varying flight conditions of hover and high speed forward flight. The shrouded duct within which a rotating propeller is contained and the movable surfaces of the tail assembly associated with the duct provide azimuth and attitude control for the aircraft and control the direction in which the slipstream from the propeller exits from the shrouded tail duct establishing a transversely directed thrust that counteracts the torque generated by the main lifting rotor and provides aircraft yaw control. The assignee of this application owns a number of patents disclosing various configurations of the "ring tail" or shrouded propeller duct structure in which various configurations of the duct containing the propeller and movable or fixed surfaces control the direction and deflection of the slip stream from the tail propeller. Typical "ring tail" structures developed by the assignee are disclosed in U.S. Pat. Nos. 3,138,349; 3,222,012; 3,241,791 and 3,260,482. All of these disclosures deal with a compound rotary wing aircraft incorporating a tail structure having an annular duct containing a constant speed, variable pitch propeller which provides thrust for both propelling the aircraft in forward flight and rotor anti-torque and yaw control forces for the aircraft in a slow speed or hovering mode. In general all of these prior art documents disclose various configurations of one or more vertically extending rudder assemblies having a large surface area mounted for pivotal motion about a vertical axis within an annular duct rearwardly of the propeller in which the degree of angular deflection of the rudder surface or surfaces transversely of the duct longitudinal axis and or provisions for modifying the camber of the rudder surface when deflected, control the direction of the propeller slip stream exiting from the rear of the duct to provide both lateral anti torque forces and azimuth directional control forces for the aircraft in all flight conditions.

U.S. Pat. No. 3,260,482, incorporated herein by reference, discloses a "ring tail" structure in which a plurality of vertically extending, multiple section vane assemblies are mounted for pivotal motion about a vertical axis in the duct behind the propeller. The degree of pivotal rotation of each of the vane assemblies between a neutral position in alignment with the axis of the duct and a deflected position extending transversely of the duct axis controls the amount the propeller slip stream is deflected in exiting from the duct to create the transversely directed thrust necessary for counteracting rotor torque and controlling the azimuth direction of the aircraft when operating in a slow speed or hover flight condition. This patent also discloses a segment of the inner duct surface on one side of the duct wall supported by a bell crank linkage for bodily movement between a retracted position within a recess in the duct interior surface and an extended position spaced inwardly from the duct wall to protrude angularly transversely across the interior of the duct forwardly of the duct trailing edge in the path of the propeller slip stream.

SUMMARY OF INVENTION

This invention is an improvement of prior "ring tail" configurations and controls which provides increased propulsive, anti-torque, longitudinal and yaw control efficiency, together with a lower drag in cruise flight at a lower installed weight. A primary aspect of the improved design involves one lateral side of the shrouded duct being configured such that a rearmost portion of the wall comprises a plurality of overlying arcuate segments that are supported at their upper and lower ends for respective pivotal rotation about a common vertical axis establishing sliding motion relative to one another in the longitudinal direction of the duct axis between a retracted position and an extended position establishing a transversely projecting rear duct extension. In the retracted position during forward high speed of the aircraft the segments of a preferred embodiment overlie one another in a mutually overlying, nesting relationship to form the outer wall portion of the rear portion of one lateral side of the shrouded duct. For low speed and hover flight conditions the duct segments are each pivoted about a vertical axis so as to slide rearwardly over one other to the extended position in which the segments adjoin one another with their edges only overlapping such that the segments extend as a unit curving obliquely transversely of the duct longitudinal axis to form a continuous, rearwardly extending extension of one lateral side of the interior wall of the duct within which the propeller slip stream is smoothly deflected substantially perpendicular to the duct and aircraft longitudinal axes. This feature, combined with the disclosed preferred embodiment of a tandemly arranged, pivotally connected multiple section single rudder surface which is an improved variation of previously utilized laterally spaced multiple rudder sections comprising a rudder assembly pivotally mounted within the duct interior of the nature disclosed in several of the previously listed "ring tail" patents, provides greatly increased efficiency in controlling the direction and transverse thrust provided by the slip stream from the ducted propeller. In particular the invention of this application provides a considerable increase in thrust efficiency of a deflected ducted propeller slip stream as compared to the configuration of U.S. Pat. No. 3,260,482 in that the disclosed invention reduces the drag and interference created by multiple side by side rudder vanes and eliminates turbulence in the interior of the shrouded duct created by the inwardly protruding vane 60 of the noted patent. This invention provides a smoothly contoured extendable duct exit channel through which a variable magnitude of the propeller slip stream is smoothly deflected with minimum turbulence through substantially 90 degrees providing the amount of transversely directed thrust required to counteract rotor torque and provide directional control in yaw when the aircraft is in a hovering mode.

Yaw control of the aircraft is further enhanced by a modification of prior known control systems for compound rotary wing aircraft incorporating the "ring tail" assembly exemplified by the system described in U.S. Pat. No. 3,332,643 by incorporating a torque ratio control unit which automatically adjusts the pitch of the tail propeller in varying proportions to a change in collective pitch dependent upon the high or low pitch setting of the pilots' propeller pitch beeper switch for establishing the intended flight mode condition ranging from hover to high speed flight.

An object of this invention is to provide an improved shrouded duct configuration for a "ring tail" rotary wing aircraft which increases the efficiency and effectiveness in controlling the deflection of a shrouded propeller slip stream.

A further object of this invention is to provide a retractable, transversely extending extension on one side of a shrouded duct of a "ring tail" rotary wing aircraft. Another object of the invention is to provide an improved version of vertically oriented propeller slip stream deflecting surfaces rotatable within an extendable duct housing of a shrouded duct "ring tail" rotary wing aircraft.

Yet another object is to provide improved longitudinal and azimuth directional control of a rotary wing compound aircraft in all flight conditions.

Yet still another object is to provide a varying ratio of change in pitch of the shrouded propeller to change of collective pitch during different flight conditions in the range between hover and high speed forward flight.

DETAILED DESCRIPTION OF THE INVENTION

Figure 1:
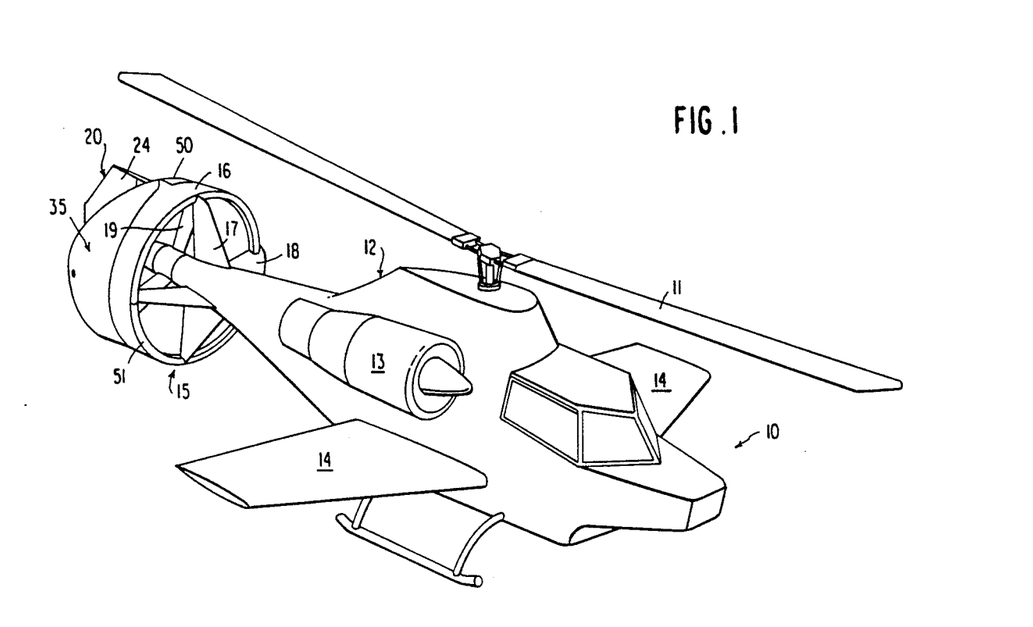
FIG. 1 is a perspective view of a helicopter having the improved tail assembly and controls contemplated by the present invention.

FIG. 1 illustrates a compound rotary wing aircraft of type described in the previously noted U.S. patents in which a single rotor 11 mounted on the fuselage 12 powered by an engine 13, fixed wings 14 extending from both sides of the fuselage provide lift in high speed forward flight with the rotor 11 in an unloaded condition. The rotor 11 provides lift for the aircraft in a slow speed and hover condition. The tail section 15 of the ring tail structure comprises an annular duct 16 supported by vertical and horizontal stabilizers 17, 18 with a variable pitch propeller 19 driven by the engine 13 contained within the interior of the duct 16. A multi-section, vertically extending rudder vane assembly 20 is mounted for rotation about a vertical axis within the interior of the duct 16 rearwardly of the propeller 19 and the aftermost portion extends rearwardly of the duct in the forward high speed flight condition of the aircraft as illustrated in FIG. 1.

Figure 11:
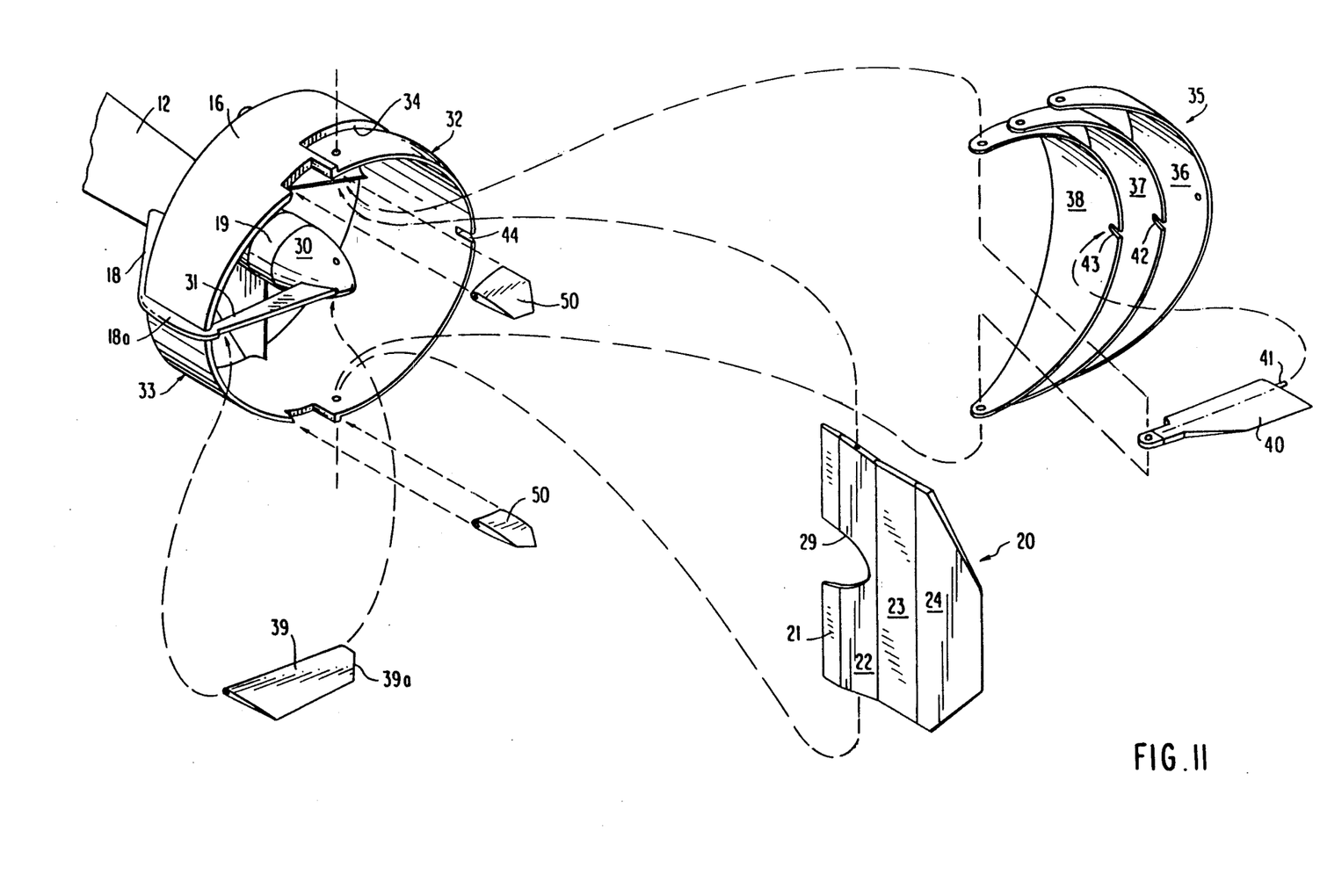
FIG. 11 is an exploded perspective view of the major components of the tail assembly.

Details of the rudder vane assembly 20 of FIG. 1 are best seen in FIGS. 3,4,8 and 9, the rudder vane assembly 20 comprising multiple vane sections 21, 22, 23, 24 interconnected in a tandem arrangement by pivotal connections 25, 26, 27, the main rudder section 22 being supported for rotation about the vertically extending axis on the torque tube 28 pivotally supported at both ends by portions of the upper and lower wall structure of the duct 16. Linkages between adjoining vane sections (not illustrated) equivalent or similar to the directional—controlling vanes of U.S. Pat. No. 3,260,432 cause the individual rudder vane sections to rotate angularly relative to one another about their pivotal connections changing the camber of the rudder vane assembly surface when the main rudder vane section 22 is rotated about its torque tube axis 28 on either side of the rudder vane neutral position shown in FIG. 3 in which all vane sections are aligned along the aircraft longitudinal axis. In the fully deflected position of maximum camber illustrated in FIGS. 7, 8 and 9 the rudder vane assembly 20 extends transversely of the interior of the duct 16 forwardly of and conforming generally to the arcuate shape of an extension 35 of the duct to be subsequently described. The middle portions of the rudder vane nose and main sections 21, 22 are cut away along line 29 (FIG. 11) to clear the propeller hub fairing 30 which is supported by a rear horizontal stabilizer member 31 that extends into the interior of the duct 16 rearwardly of the propeller 19 from the rearmost portion 18a of the horizontal stabilizer 18.

Figures 2, 6, 7:
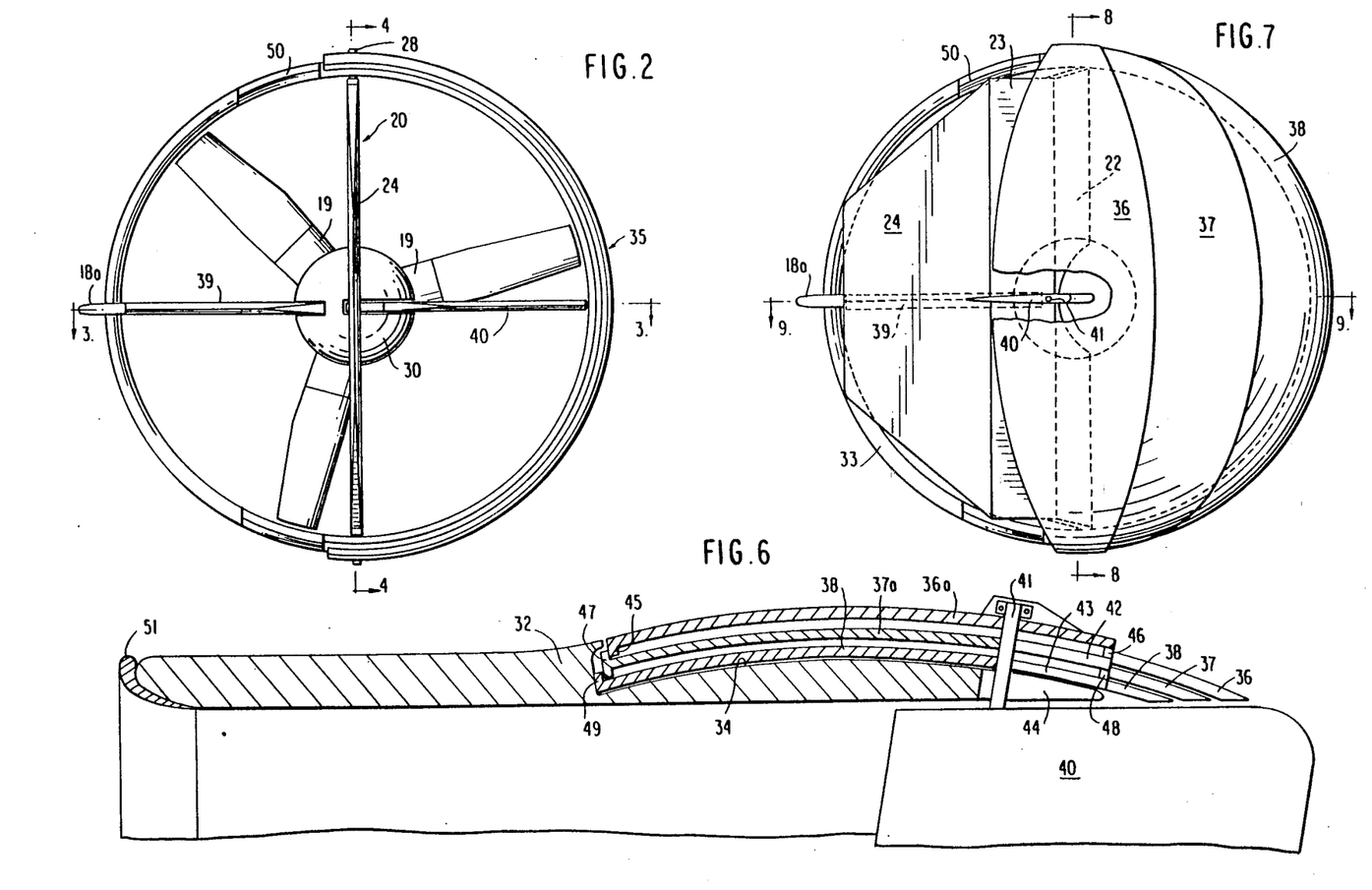
FIG. 2 is a rear elevation of the tail assembly of the aircraft of FIG. 1 in a forward high speed flight condition.
FIG. 6 is an enlarged section of the topmost portion of FIG. 3 showing the multi-segment duct extension elbow of the invention in the retracted position.
FIG. 7 is a rear elevation of the tail assembly of the aircraft in a hovering flight condition.
Figures 3, 4, 5:
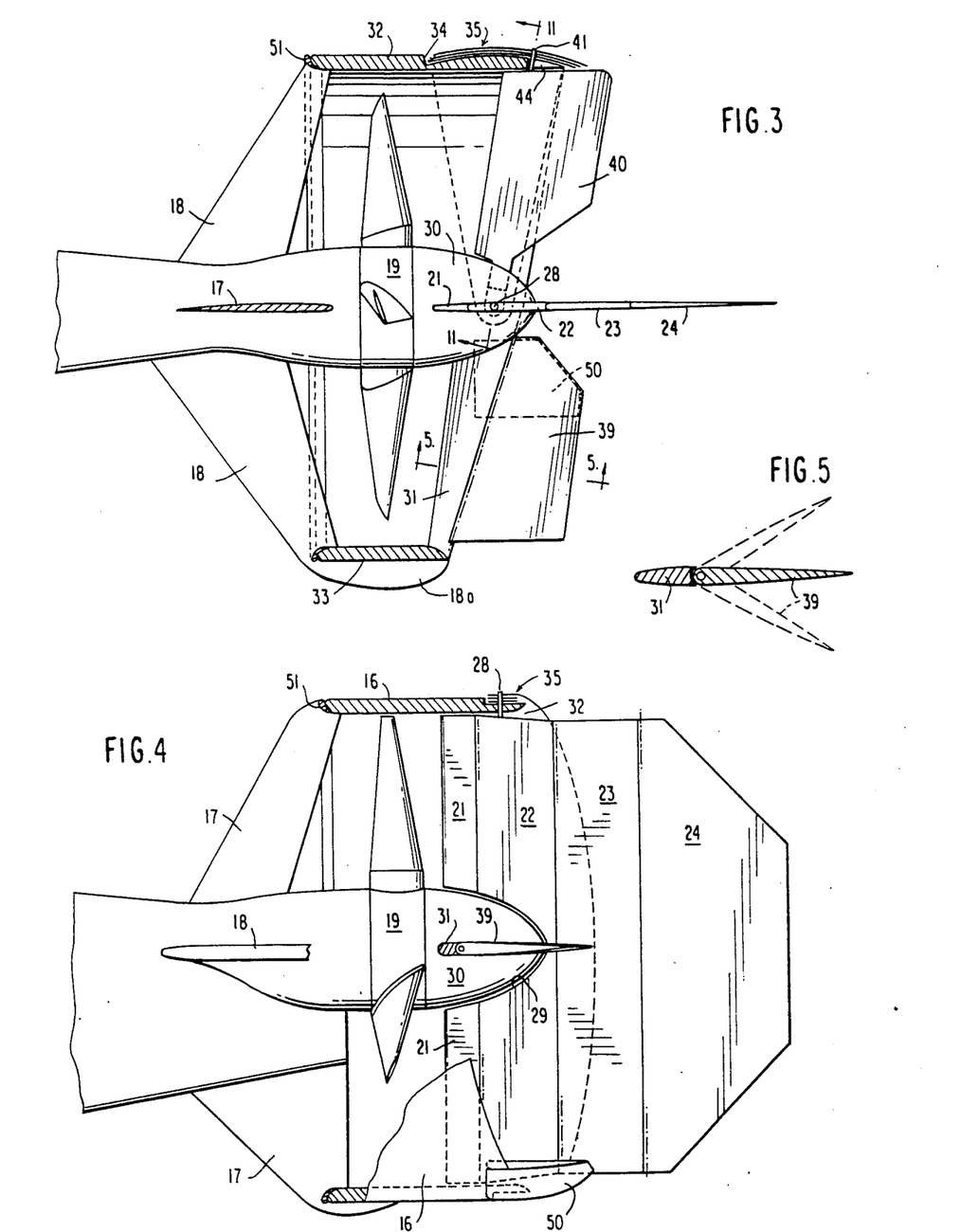
FIG. 3 is a horizontal cross section along section line 3—3 of FIG. 2.
FIG. 4 is a vertical cross section along section line 4—4 of FIG. 2.
FIG. 5 is a vertical cross section of an aircraft elevator surface along section line 5—5 of FIG. 3.
Figure 8:
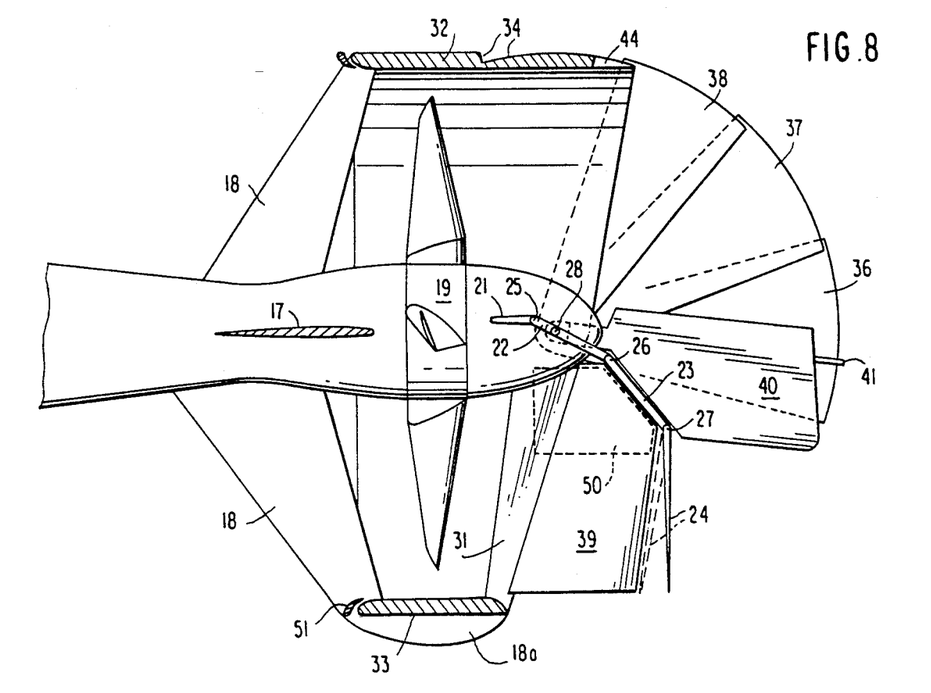
FIG. 8 is a vertical cross section along section line 8—8 of FIG. 7.
Figure 9:
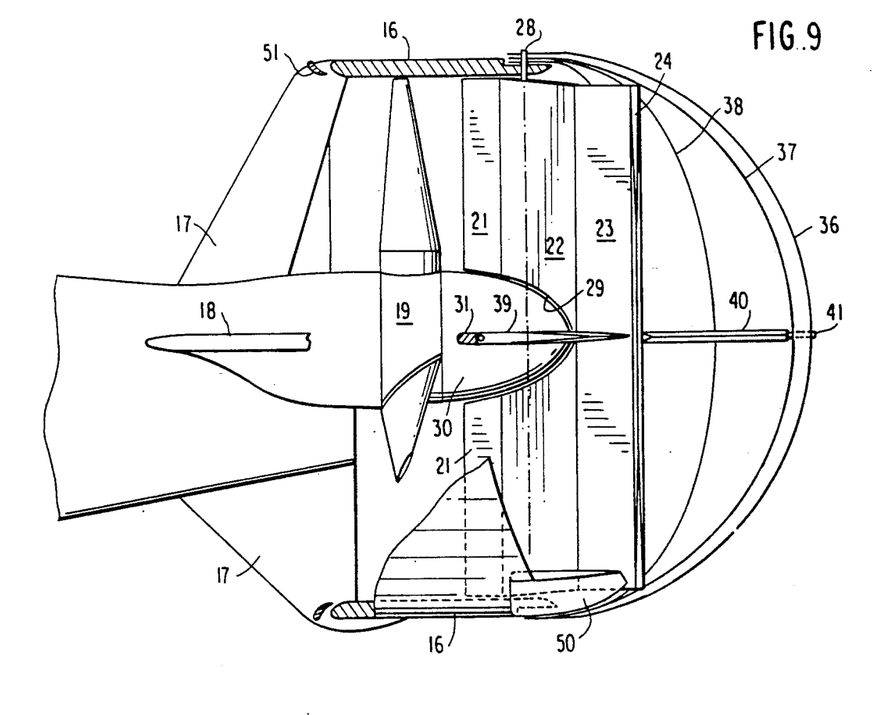
FIG. 9 is a horizontal cross section along section line 9—9 of FIG. 7
Figure 10:
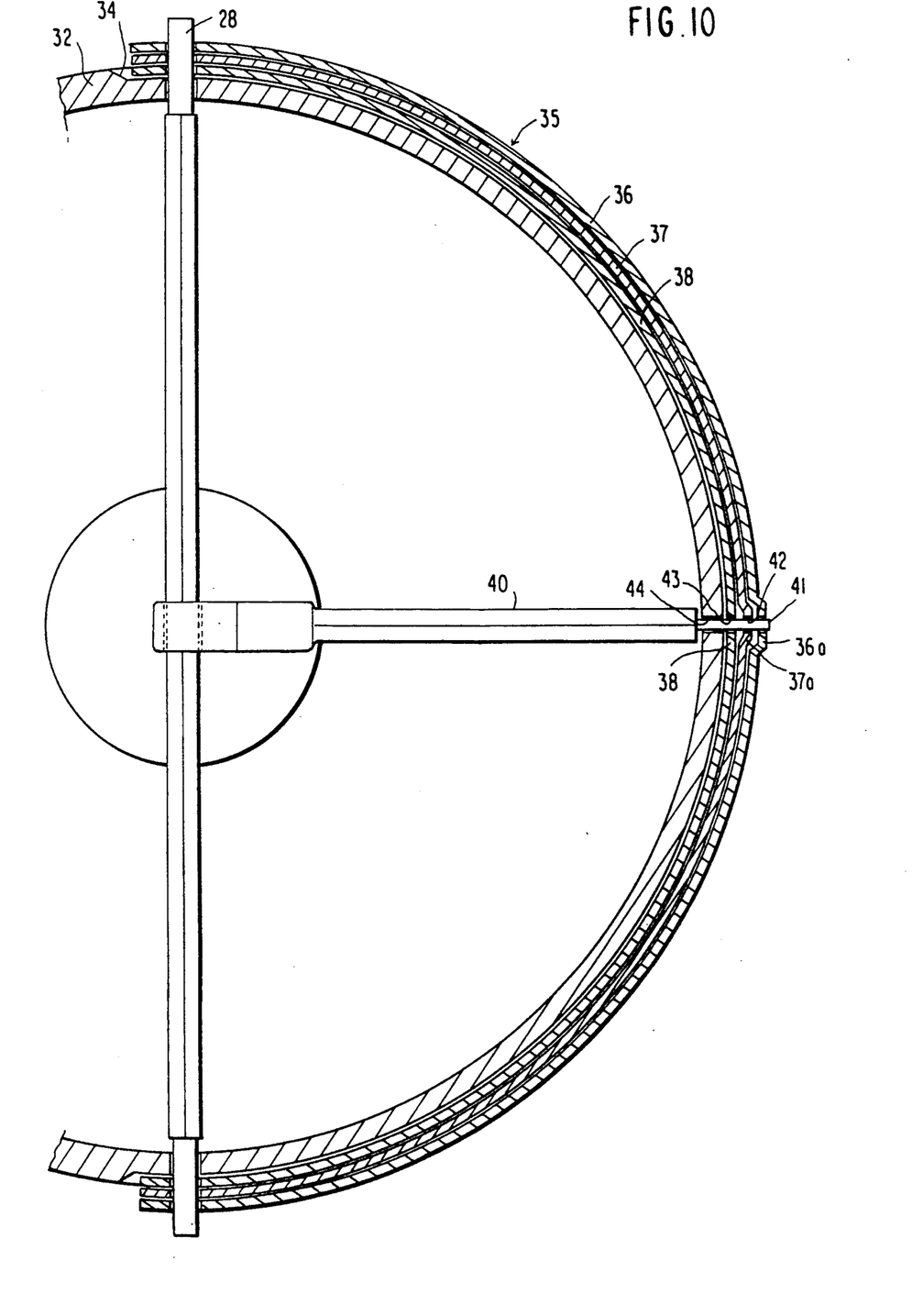
FIG. 10 is a partial vertical cross section taken along section line 11—11 of FIG. 3.

One lateral side 32 of the duct 16 is longer than the other side 33 to accommodate the propeller slip stream deflected by the improved ring tail configuration of the invention. The exterior of this longer side 32 of the duct has a recess 34 for accommodating the multi-segment extendable duct elbow assembly 35 which forms the outer wall of the longer lateral side 32 of the duct 16. In the illustrated and preferred embodiment, the elbow assembly 35 comprises three overlying arcuate segments, an outer segment 36, a middle segment 37 and an inner segment 38 which are pivotally supported at their upper and lower ends for rotation in a sliding relationship to one another about the vertically extending rudder vane torque tube 28 for movement between a retracted position in a mutually overlying, nesting relationship establishing the outer wall contour of the longer duct lateral side 32, as illustrated in FIGS. 3, 4 and 6, and an extended position in a partially overlapping and adjoining relationship establishing a continuous arcuate extension of the annular duct 16 that extends rearwardly of the annular duct wall, obliquely of the duct interior and transversely of the duct longitudinal axis as illustrated in FIGS. 7, 8 and 9. As best seen in FIG. 8, the combination of the multi-sector rudder vane 20 with its sections 21, 22, 23, 24 pivotally rotated relative to one another in the form of a arcuate deflecting vane inside of and forwardly of the arcuate, clam shell shaped, rearward extension of the duct 16 provided by the elbow segments 36, 37, 38 in the extended position establish a smooth arcuate channel through which the propeller slip stream is deflected with minimum turbulence and resistance through substantially 90 degrees.

As in the ring tail configuration of U.S. Pat. No. 3,260,482 and other "ring tail" patents, provision is made for an upwardly and downwardly pivoting elevator surface assembly extending horizontally across the interior of the duct 16 to establish pitching moments for the aircraft. In a preferred configuration of this invention, the elevator assembly comprises two elevator surfaces. One is a conventional half-elevator surface 39 pivotally supported for rotation about a fixed horizontal axis for up and down motion on the rear side of the horizontal stabilizer member 31 to extend across half of the duct interior from the propeller shroud to the shorter side 33 of the interior of the duct 16. The other is a horizontally movable elevator surface 40 supported at its inner end for rotation in a horizontal plane about the vertical axis of the rudder vane torque tube 28 for horizontal movement along with the segments of the elbow assembly 35 when pivoting between the retracted and extended positions. Alternatively, the vertical rotational axis of the movable elevator 40 could be other than that of the rudder torque tube 28. A pin 41 at the outer end of the movable elevator surface 40 is pivotally contained in a raised portion 36a of the outer elbow segment and extends through slots 42, 43 in the trailing edges of the middle and inner elbow segments 37, 38 and slot 44 in the trailing edge of the duct recessed portion 34. The inner end portion of the movable elevator surface 40 is pivotally supported for up and down rotation of the elevator surface 40 about a horizontal axis along the line of the pin 41. Referring to FIG. 6, the forward end of the outer elbow segment 36 has an inwardly extending finger 45, the rear end of the middle elbow segment 37 has an outwardly extending finger 46 and the forward end a T-shaped finger 47, and the rear end of the inner elbow segment 38 has an outwardly extending finger 48 and the forward end an outwardly extending finger 49. As can be readily ascertained from FIG. 6, rotation of the outer elbow segment 36 from its retracted position with accompanying rearward sliding motion establishes consecutive contact of the fingers 45, 46, 47 and 48 that carries all elbow segments from the retracted to the extended positions. The consecutive contact of the fingers 45, 47 and 49 causes the elbow segments to rotate and slide forwardly from the extended to the retracted position upon forward movement of the outer elbow segment 36. Trim tabs 50 may be provided at the top and bottom rear surfaces of the duct 16 to provide pitching forces additional to that provided by the two elevator surfaces 39, 40 but they do not form any part of this invention. Extendable slats 51 are mounted along the annular, streamline tapered leading edge of the duct 16 and supported by the duct as are the slats on the wing leading edge of a fixed wing aircraft. Extension of the slats at low airspeeds as in FIG. 8 and 9 establishes a channel between the slat and duct establishing low turbulence air flow and improved aerodynamic efficiency of the air flow through the duct.

As explained in U.S. Pat. Nos. 3,309,937; 3,241,791 and 3,138,349, the positions and movements of the components of the "ring tail" structure of a compound rotary wing aircraft are controlled in different degrees relative to one another upon operation of the pilot's controls when the aircraft is in a hover or slow speed flight condition being supported, propelled and controlled in altitude by its overhead rotor and when in a high speed cruising flight condition being supported and controlled in altitude by aerodynamic surfaces and propelled by the tail mounted propeller. When in a hover condition the structural components of the ring tail are positioned as will establish deflection of the tail propeller slip stream to a maximum degree and movement of the pilot's rudder pedals controls the pitch of the tail propeller such that the magnitude of the deflected propeller slip stream provides yaw control that is equal to, greater than, or less than that required to counteract the rotor torque, the deflected position of the rudder vane of the ring tail being essentially unaffected by rudder pedal movement. Rotor torque being a function of the collective pitch setting of the rotor, changes in collective pitch to effect vertical movement of the aircraft requires rudder pedal movement to maintain a given heading in yaw. When in a high speed cruising flight condition with the rotor unloaded and the aircraft lift being provided by the fixed wings, the structural components of the "ring tail" are positioned such that little or no propeller slip stream deflection need be created to counteract rotor torque, movement of the pilot's rudder pedals controlling only the position of the rudder vane from neutral sufficiently to establish yaw control in forward flight and having no effect on the pitch of the tail propeller which provides thrust for propelling the aircraft in forward flight and is in a high pitch range which can absorb up to the full power of the engine for high speed flight.

Figure 12:
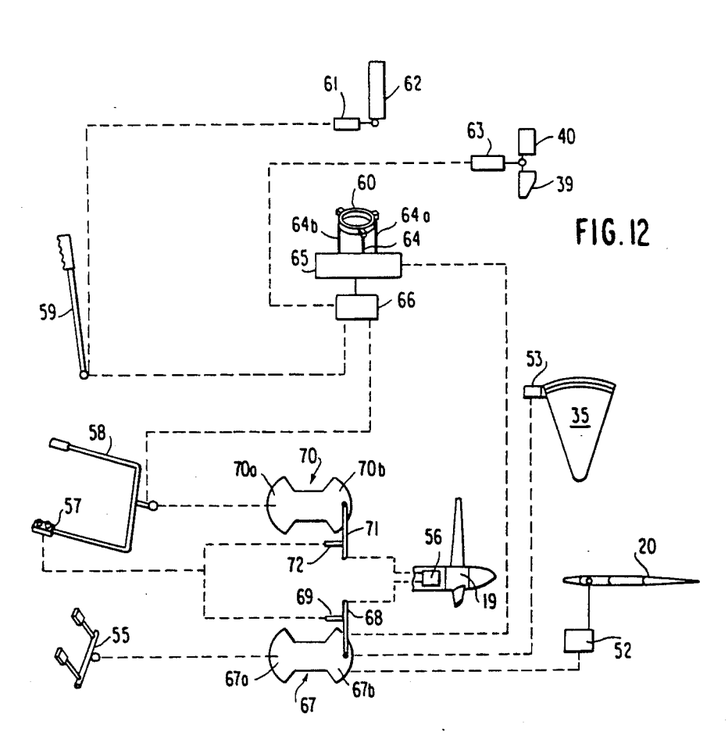
FIG. 12 is a schematic diagram of a flight control system for an aircraft having the improved tail assembly to include provisions for coordinating a change in propeller pitch upon changing collective pitch under varying flight conditions between hover and high speed.

The control system for the disclosed compound rotary wing aircraft must provide for establishing the positions and movements of the components of the improved "ring tail" structure relative to each other in coordination with the rotor swash plate pitch setting and positions of the aircraft aerodynamic control surfaces by operation of the pilot's cyclic and collective pitch controls during the full range of flight conditions as will provide a smooth and gradual transition between the hover and high speed flight conditions of the aircraft. The components indicated schematically in FIG. 12 represent such a control system and basically comprise the compound rotary wing aircraft control system components described in U.S. Pat. No. 3,332,643 modified to incorporate provisions for the segmented elbow assembly 35 being moved between its retracted and extended positions concurrently with the rotor vane assembly 20 being moved between its neutral and fully deflected positions in addition to providing another component for coordinating a change in the pitch of the shrouded propeller pitch with changes in rotor collective pitch when the aircraft is in the low pitch range for hover or slow speed flight conditions. Although the components of FIG. 12 could be mechanical in nature similar to or equivalent to those described in U.S. Pat. Nos. 3,332,643 and 3,309,937, incorporated herein by reference, the components would preferably be in the nature of a computer programmed in a manner known to those skilled in the art that would create signals to the actuators for the "ring tail" components comprising the rudder vane, the segmented elbow assembly and the ducted propeller and also to the actuators for the rotor swash plate and the aileron (flaperon) and elevator aerodynamic control surfaces in the manner described by the aforesaid incorporated patents.

Referring to FIG. 12, the pilot's controls are conventional of the type disclosed in U.S. Pat. No. 3,332,643 comprising a cyclic stick 59 for control of the aircraft attitude in pitch and roll, the collective pitch control lever 58 for control of the main rotor pitch collectively, the tail propeller pitch control beeper switch 57 for setting the propeller pitch to the high or low range and normally mounted on the collective pitch control lever 58 and the rudder pedals 55 for directional control of the aircraft in yaw. With the exception of a torque ratio control unit 70 connected between the collective pitch lever 58 and the propeller pitch actuator 56 having a further connection to the propeller pitch control beeper switch 57, which is subsequently discussed and described, and the presence of the previously described segmented elbow assembly 35 and its actuator 53 connected to the output of a rudder ratio control unit 67 in the same manner as the rudder actuator 52; the control system components connected between the pilot's controls and the actuators for the main rotor swash plate, the tail propeller and the aircraft aerodynamic control surface could be the same type and function in the same manner as those described in U.S. Pat. No. 3,332,643. As in that patent, a rotor pitch mixing assembly 66 and rotor phase-out assembly 65 in series between the cyclic control stick 59 and the collective pitch lever 58 transmits signals to the actuators 64, 64a and 64b of the swash plate 60 establishing the cyclic and pitch settings of the main rotor.

A rudder ratio control unit 67 is connected between the rudder pedals 55 and actuators 56, 52 and 53 for the tail propeller pitch control, the rudder vane and the segmented elbow assembly. As in the ratio mechanism of U.S. Pat. No. 3,309,937, the rudder ratio unit input and output quadrants 67a and 67b and its pitch setting lever 68 pivotally positioned relative the output quadrant by the pitch setting lever actuator 69 from signals received from the beeper switch 57 function to generate signals that are transmitted to the rudder vane actuator 52 and also to the segmented elbow assembly actuator 53 which establish both the degree of deflected and extended positions of the rudder vane 20 and the segmented elbow assembly 35 and a varying ratio of rudder pedal to rudder vane movement dependent upon the pitch setting signal received by the pitch setting lever actuator 69 from the propeller pitch beeper switch 57. Further, as in the ratio mechanism of U.S. Pat. No. 3,309,937, the pitch lever 68 of the rudder ratio control unit 67 transmits signals to the propeller pitch actuator 56 varying the ratio of propeller pitch changes to rudder pedal movement dependent upon the pitch setting transmitted to the pitch setting lever actuator 69 by the propeller pitch control beeper switch 57. Also, as is readily apparent from U.S. Pat. No. 3,332,643 the rudder ratio control unit 67 also generates signals transmitted to the rotor phase-out assembly 65 which phase out rotor pitch signals received from the rotor pitch mixing assembly 66 when the pitch setting lever actuator 69 of the rudder ratio control unit 67 receives high pitch range signals from the propeller pitch control beeper switch 57 shifting attitude control of the aircraft in pitch and roll to movable aerodynamic control surfaces through signals transmitted from the cyclic control stick to the actuator 61 of the ailerons (flaperons) 62 and to the actuator 63 of the elevators 39, 40.

As previously noted, a change in rotor collective pitch changes rotor torque. Thus in previously known control systems for compound rotary wing aircraft, such as disclosed in U.S. Pat. No. 3,332,643, a change in collective pitch to effect vertical movement of the aircraft requires the pilot to operate the rudder pedals and change tail propeller pitch to counteract the resulting change in torque in order to maintain an established heading in yaw. The control system of FIG. 12 includes a torque ratio control unit 70 having a connection to the propeller pitch beeper switch 57 and connected between the collective pitch lever 58 and tail propeller pitch actuator 56 which functions to compensate automatically for a change in rotor torque when the collective pitch control lever is moved by changing the pitch of the tail propeller an amount as will modify the thrust of the deflected airstream to compensate for the change in rotor torque. The torque ratio control unit 70 could be an adaptation of the rudder ratio control mechanism of U.S. Pat. No. 3,309,937 in which the control mechanism transmits pitch change signals to the propeller pitch actuator 56 upon receiving signals generated by movement of the collective pitch control lever 58 when the propeller pitch beeper switch 57 is in the low pitch range much in the same way as the rudder ratio control unit 67 creates signals changing the tail propeller pitch upon receiving signals generated by movement of the rudder pedals 55.

To better explain the manner in which the rudder ratio control unit of U.S. Pat. No. 3,309,937 could be adapted to perform the function of the torque ratio control unit 70 of FIG. 12, a brief summary of the nature of the rudder ratio control mechanism of U.S. Pat. No. 3,309,937 with reference to the reference numerals contained in this specification and drawings of that patent might be helpful. The rudder ratio control mechanism of U.S. Pat. No. 3,309,937 basically comprises rudder pedal cable connections to a rotatable input quadrant 1 coupled through a variety of link and actuator connectors 9 to a rotatable output quadrant 4 having cable connections to the rudder. The output quadrant 4 pivotally supports a pitch setting lever 32 through a series of levers and bell cranks such that the pivotal position of the pitch setting lever 32 relative to the output quadrant 4 is established by the pitch actuator 37 connected to the pitch setting lever 32 and receiving signals from the propeller pitch control beeper switch. The pitch setting lever 32 connects to the rod 40 of the propeller pitch control and also has a feedback rod 31 connecting through a series of levers and bell cranks to the pivotal connection 12 of the quadrant coupling connectors 9. As is readily apparent from U.S. Pat. No. 3,309,937 the pivotal position of the pitch setting lever 32 movably supported on the rotatable output quadrant 4 with its pivotal position relative to the rotatable output quadrant 4 being determined by signals from the propeller beeper switch establishes the setting of the pitch of the tail propeller and through the feedback rod 31 and the connections to the coupling 9 between the input and output quadrants 1 and 4 establishes the ratio of movement between the respective input and output quadrants.

To adapt the known rudder ratio control mechanism to function as a torque ratio control unit 70 schematically illustrated in FIG. 12, cable connections to the input quadrant 70a would be to the rotor collective pitch lever 58, the output quadrant 70b would have no cable connections and the pitch setting lever 71 pivotally supported on the output quadrant 70b at the pivotal position established by the pitch lever actuator 72 from signals of the beeper switch 57 would function similarly to the rudder ratio control mechanism of the referenced patent in controlling the pitch of the tail propeller and the feedback rod connection from the pitch setting lever 71 also controlling the ratio of movement between the input and output quadrants in establishing a varying ratio of propeller pitch change to rotor collective pitch change dependent upon the setting of the propeller pitch control beeper switch 57. As previously noted, in lieu of being a mechanical mechanism the torque ratio control unit would preferably be incorporated into a computer programmed to generate the same control signals as would be provided by the described adaptation of the rudder ratio control unit of U.S. Pat. No. 3,309,937 in functioning as the torque ratio control unit 70 of FIG. 12.

As is readily apparent from the above description and FIG. 12, when the propeller pitch control beeper switch 57 is set in the low pitch range for hover and slow speed flight, the attitude and propulsion of the aircraft is established by the pitch setting of the rotor swash plate 60 from signals passing through the phase-out assembly 65 from the mixing assembly 66 and generated by the position of the pilot's cyclic control stick 59 and collective pitch lever 58. Directional control of the aircraft in azimuth is controlled by the output signals transmitted by the rudder ratio control unit 67 to the actuator 56 of the propeller pitch control by movement of the rudder pedals 55 supplemented by output signals transmitted by the torque ratio control 70 to the actuator 56 of the propeller pitch control upon movement of the collective pitch control lever 58, the rudder vane 20 having been positioned in the fully deflected position and the segmented elbow assembly 35 having been extended to the fully extended position illustrated in FIGS. 7, 8 and 9 by the output signal generated in the rudder ratio control unit 67 when the propeller pitch control beeper switch 57 is set in low pitch. As previously noted, the changes in the pitch of the propeller created by movement of the rudder pedals and collective pitch control lever establish changes in the amount of deflected propeller slip stream required to compensate for rotor torque or rotor torque change and creates such additional transverse thrust as required to yaw the aircraft to the desired heading. The incorporation of the torque ratio control unit 70 into the control system automatically corrects for the change in rotor torque created by movement of the collective pitch lever 58.

When the propeller pitch control beeper switch 57 is actuated to increase the pitch of the tail propeller into the high pitch range for high speed cruising, the rudder ratio control unit 67 generates signals that move the extended segmented elbow assembly 35 toward its retracted position, move the deflected rudder vane assembly 20 toward its neutral position in alignment with the longitudinal axis of the tail duct while, at the same time, gradually removing the effect of rudder pedal movement on tail propeller pitch and transferring the effect of rudder pedal movement to controlling the position of the rudder vane 20 with respect to its neutral position to effect yaw control of the aircraft, and initiating a phase-out of the rotor pitch signals transmitted to the rotor swash plate 60 through the phase-out assembly 65 so that attitude control of the aircraft in pitch and roll is established by signals transmitted by movement of the cyclic controls stick 59 to the actuators controlling the positions of the aerodynamic elevator surfaces 39, 40 and ailerons (flaperons) 62. Setting the propeller pitch control beeper switch 57 into the high pitch range also generates signals from the torque ratio control unit 70 gradually removing the effect of movement of the collective pitch control lever 58 on propeller pitch of the tail propeller which, when in high pitch absorbs substantially all of the engine power in propelling the aircraft at high speed with the rotor unloaded with lift being established by the fixed wing, attitude control being established through the elevator and aileron (flaperon) surfaces and yaw control being established through the rudder vane.

It should be understood that the foregoing disclosure involves a typical embodiment of the invention and that numerous modifications or alterations may be made therein without departing from the spirit and scope of the invention as set forth in the appendant claims.

What is claimed is:

1. In a flight control system for a rotor propelled rotary wing aircraft having a tail assembly comprising an annular duct having leading and trailing edges and within the interior of which a variable pitch propeller having pitch control means actuatable by pilot operable propeller pitch adjusting means is concentrically mounted for rotation forwardly of means for deflecting the propeller slip stream exiting from said duct trailing edge transversely of the duct longitudinal axis, said deflecting means including a plurality of arcuate elbow segments extending partially circumferentially of one lateral side of said duct adjacent said duct trailing edge, means pivotally supporting said elbow segments for rotation between a retracted position in which said segments are in a mutually nesting position coincident with said duct one lateral side and an extended position in which said segments are in a mutually adjoining relationship extending obliquely transversely of said duct longitudinal axis rearwardly of said duct trailing edge and said flight control system includes pilot operable yaw control means for changing pitch settings of said propeller pitch control means and for moving said elbow segments between said retracted and extended positions dependent upon the pitch range setting of said pilot operable propeller pitch adjusting means, the improvement comprising torque compensation means connected between pilot operable means for controlling the pitch of said rotor and said propeller pitch control means for establishing changes in the pitch of said propeller proportional to changes in collective rotor pitch in varying ratios dependent upon the pitch range setting of said pilot operable propeller pitch adjusting means.

2. The improved flight control system of claim 1 wherein said deflecting means additionally includes a vertically extending rudder surface, means supporting said rudder surface within the interior of said duct rearwardly of said propeller for rotation about a vertical axis between a neutral position in alignment with said duct longitudinal axis and a fully deflected position extending transversely of said duct and means operable by said yaw control means for moving said rudder surface between said neutral and fully deflected positions concurrently with movement of said elbow segments between said retracted and extended positions.

3. An improved flight control system for a rotary wing aircraft having a tail assembly comprising an annular duct within the interior of which a variable pitch propeller having pitch control means actuatable by pilot operable propeller pitch adjusting means, said propeller being concentrically mounted within said duct for rotation forwardly of propeller slip stream deflecting surface means, said propeller slip stream deflecting surface means including a plurality of arcuate elbow segments extending partially circumferentially of one lateral side of said duct and means pivotally supporting said elbow segments for rotation between a retracted position in which said segments are in a mutually nesting position coincident with said duct one lateral side and an extended position in which said segments are in a mutually adjoining relationship extending obliquely transversely of said duct, said improved flight control system comprising pilot operable yaw control means for changing pitch settings of said propeller pitch control means and for moving said elbow segments between said retracted and extended positions dependent upon the pitch range setting of said pilot operable propeller pitch adjusting means and torque compensation means connected between pilot operable rotor collective pitch control means and said propeller pitch control means for establishing changes in the pitch of said propeller in amounts proportional to changes of rotor collective pitch in varying ratios of propeller pitch to rotor collective pitch changes dependent upon the pitch range setting of said pilot operable propeller pitch adjusting means.

4. An improved flight control system for a rotary wing aircraft having a main rotor and a tail assembly comprising an annular duct within the interior of which a variable pitch propeller having a pitch control means is concentrically mounted for rotation forwardly of means for controlling the direction in which the propeller slip stream exits from said duct transversely of the longitudinal axis of said duct, said control system comprising pilot operable means for controlling the pitch of said rotor cyclically, pilot operable means for controlling the pitch of said rotor collectively, pilot operable means for adjusting the setting of said propeller pitch control means in a range between a high and low pitch setting, pilot operable yaw control means for controlling the setting of said propeller slip stream direction control means and said propeller pitch control means dependent upon the pitch range setting of said pilot operable propeller pitch adjusting means and torque compensation means interconnecting said pilot operable rotor collective pitch control means and said propeller pitch control means for establishing changes in the pitch of said propeller in varying proportions to the amount of change in rotor collective pitch established by operation of said collective pitch control means dependent upon the pitch range setting of said pilot operable propeller pitch adjusting means and said means for controlling the exit direction of said propeller slip stream comprises a plurality of arcuate elbow segments extending partially circumferentially of one lateral side of said duct, means pivotally supporting said elbow segments for rotation between a retracted position in which said segments are in a mutually nesting position coincident with said duct one lateral side and an extended position in which said segments are in a mutually adjoining relationship extending transversely of said duct longitudinal axis, a vertically extending rudder surface, means supporting said rudder surface for rotation about a vertical axis between a neutral position in alignment with said duct longitudinal axis and a fully deflected position extending transversely of said duct and means operable by said yaw control means for concurrently moving said elbow segments between said retracted and extended positions and said rudder surface between said neutral and fully deflected positions dependent upon the pitch range setting of said pilot operable propeller pitch adjusting means.

* * * * *